United States Patent
Watanabe et al.

(10) Patent No.: US 7,527,760 B2
(45) Date of Patent: May 5, 2009

(54) RESIN MOLD AND METHOD FOR MANUFACTURING THE SAME

(75) Inventors: Tatsuya Watanabe, Anjo (JP); Yozo Iwai, Kuwana (JP); Yasunori Kawamoto, Toyota (JP)

(73) Assignee: DENSO CORPORATION, Kariya-city (JP)

( * ) Notice: Subject to any disclaimer, the term of this patent is extended or adjusted under 35 U.S.C. 154(b) by 577 days.

(21) Appl. No.: 10/934,444

(22) Filed: Sep. 7, 2004

(65) Prior Publication Data

US 2005/0077656 A1    Apr. 14, 2005

(30) Foreign Application Priority Data

Oct. 14, 2003    (JP) .............................. 2003-354236

(51) Int. Cl.
B29C 35/08    (2006.01)

(52) U.S. Cl. ........................ 264/496; 264/219; 264/482

(58) Field of Classification Search ............. 435/174.4; 264/219, 482, 494, 496
See application file for complete search history.

(56) References Cited

U.S. PATENT DOCUMENTS

| | | | | |
|---|---|---|---|---|
| 3,790,744 A * | 2/1974 | Bowen | ................... | 219/121.69 |
| 3,989,778 A * | 11/1976 | Osborne | ...................... | 264/482 |
| 4,475,027 A * | 10/1984 | Pressley | .................... | 219/121.6 |
| 4,636,609 A * | 1/1987 | Nakamata | ............... | 219/121.64 |
| 4,959,522 A * | 9/1990 | Rossi | .................... | 219/121.75 |
| 4,988,274 A * | 1/1991 | Kenmochi | ................ | 425/174.4 |
| 5,155,323 A | 10/1992 | Macken | | |
| 5,252,265 A * | 10/1993 | Cirri | ........................... | 264/485 |
| 5,279,693 A * | 1/1994 | Robinson et al. | .......... | 156/272.8 |
| 5,478,983 A | 12/1995 | Rancourt | | |
| 6,007,756 A * | 12/1999 | Weiteder et al. | ............ | 264/400 |
| 6,016,227 A * | 1/2000 | Hopkins et al. | ............. | 359/668 |
| 6,322,958 B1 * | 11/2001 | Hayashi | ................... | 430/495.1 |
| 6,573,531 B1 | 6/2003 | Im et al. | | |
| 6,592,239 B1 | 7/2003 | Akiyama et al. | | |

(Continued)

FOREIGN PATENT DOCUMENTS

DE        196 16 863        10/1996

(Continued)

OTHER PUBLICATIONS

Reasons for Rejection dated Oct. 23, 2007 in corresponding Japanese Patent Application No. 2003-354236 (with English translation).

(Continued)

*Primary Examiner*—Yogendra Gupta
*Assistant Examiner*—Emmanuel S Luk
(74) *Attorney, Agent, or Firm*—Posz Law Group, PLC (57) ABSTRACT

A method for manufacturing a resin mold includes the steps of: attaching a transmitting resin member capable of transmitting a laser beam and an absorbing resin member capable of absorbing the laser beam; and irradiating the laser beam on an interface between the transmitting resin member and the absorbing resin member from a surface of the transmitting resin member so that a welding spot is formed on the interface and the transmitting resin member and the absorbing resin member are welded. The laser beam is irradiated homogeneously on the interface by a homogenizer so that a center portion of the welding spot and an outer portion of the welding spot are heated homogeneously by the laser beam.

4 Claims, 7 Drawing Sheets

U.S. PATENT DOCUMENTS

| | | |
|---|---|---|
| 6,635,554 B1 | 10/2003 | Im et al. |
| 2001/0045418 A1 | 11/2001 | Brandinger et al. |
| 2003/0003179 A1* | 1/2003 | Farnworth et al. ....... 425/174.4 |
| 2003/0098295 A1 | 5/2003 | Kawamoto et al. |
| 2004/0099645 A1 | 5/2004 | Kawamoto et al. |
| 2006/0113288 A1 | 6/2006 | Kawamoto et al. |

FOREIGN PATENT DOCUMENTS

| | | |
|---|---|---|
| EP | 0 865 863 | 9/1998 |
| EP | 1 486 314 A1 | 12/2004 |
| EP | 1 486 315 A2 | 12/2004 |
| JP | A-59-70486 | 4/1984 |
| JP | A-60-191689 | 9/1985 |
| JP | A-2-266918 | 10/1990 |
| JP | A-2001-71384 | 3/2001 |
| JP | A-2001-105500 | 4/2001 |
| JP | A-2001-277364 | 10/2001 |
| JP | A-2001-334578 | 12/2001 |
| JP | A-2002-067165 | 3/2002 |
| JP | A-2004-063217 | 2/2004 |
| JP | A-2004-341317 | 12/2004 |
| WO | WO 03/078138 A1 | 9/2003 |

OTHER PUBLICATIONS

First Office Action issued from Chinese Patent Office issued on Dec. 23, 2005 for the corresponding Chinese patent application No. 200410088149.6 (English translation thereof).

European Search Report dated Feb. 15, 2008 in corresponding European Patent Application No. 04021237.5-1253.

Office Action dated Jan. 25, 2008 in corresponding Chinese Patent Application No. 2004100881496 (and English translation).

* cited by examiner

RESIN MOLD AND METHOD FOR MANUFACTURING THE SAME

CROSS REFERENCE TO RELATED APPLICATION

This application is based on Japanese Patent Application No. 2003-354236 filed on Oct. 14, 2003, the disclosure of which is incorporated herein by reference.

FIELD OF THE INVENTION

The present invention relates to a resin mold manufactured by welding with using a laser beam and a method for manufacturing the same.

BACKGROUND OF THE INVENTION

A laser beam welding method is used for a bonding between resin members. The method is, for example, disclosed in Japanese Patent Application Publications No. 2001-105500, No. 2001-71384, and No. S60-214931 (which corresponds to U.S. Pat. No. 4,636,609).

Figure 8A:
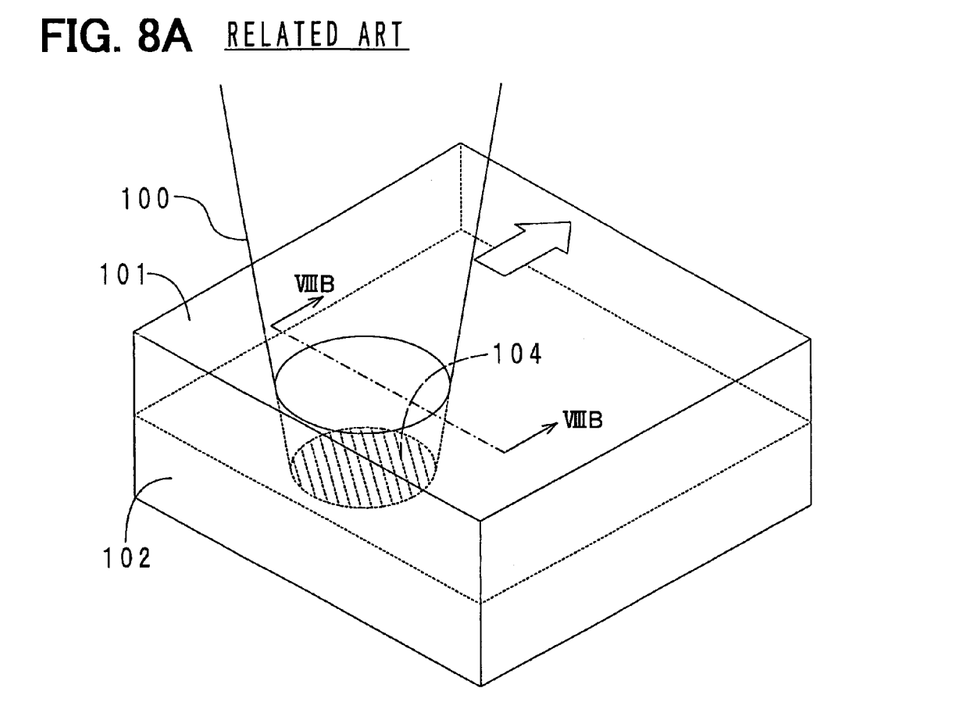
FIG. 8A is a perspective view explaining a method for manufacturing a resin mold by using a conventional laser beam welding method.
Figure 8B:
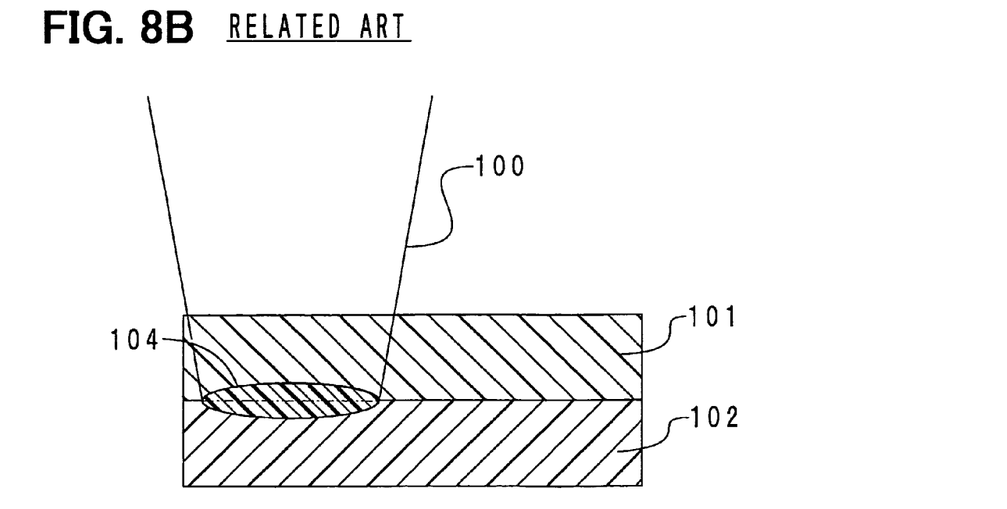
FIG. 8B is a cross sectional view showing the resin mold taken along line VIIIB-VIIIB in FIG. 8A.

FIGS. 8A and 8B are a schematic view explaining a method for manufacturing a resin mold by using a conventional laser beam welding method. FIG. 8B is a cross sectional view along with a scanning direction. In the laser beam welding method, firstly, the first resin member 101 and the second resin member 102 are laminated. The first resin member 101 is capable of transmitting a laser beam 100. The second resin member is capable of absorbing the laser beam 100. Next, the laser beam 100 is irradiated from a first resin member side. The irradiated laser beam 100 transmits through the first resin member 100, and reaches an attached surface (i.e., an interface) between the first resin member 101 and the second resin member 102. The second resin member 102 absorbs energy of the laser beam 100. The second resin member 102 is heated and melted by the absorbed energy. The heat generated in the second resin member 102 conducts to the first resin member 101. The first resin member 101 is also melted by the conducted heat. Thus, a welding spot 104 is formed at the attached surface between the first and second resin members 101, 102. The laser beam 100 is scanned in a direction shown by an outline arrow in FIG. 8A. Therefore, the welding spot 104 is linearly linked. Accordingly, after welding, a welded linear trace is formed along with a scanning track. By using the laser beam welding, since the first and second resin members 101, 102 are diffused mutually at the welding spot 104, a strong bonding strength is obtained. Therefore, the laser beam welding method is used widely, for example, for manufacturing a resin mold such as a part of an automotive vehicle.

However, energy distribution of the laser beam 100 at the welding spot 104 is not homogeneous. Energy density of the laser beam 100 has a Gaussian distribution so that the energy density at the center portion becomes maximum, and the energy density becomes lower as it goes to the outside. Therefore, when the outer portion of the welding spot 104 is heated up to a predetermined temperature, the center portion of the welding spot 104 becomes over heat. Therefore, resin may be pyrolytically decomposed so that the center portion of the welding spot 104 is vaporized. Further, since melting amount of resin at the center portion is larger than that at the outer portion, shrinkage may be generated after cooling. The vaporization of resin and the generation of shrinkage cause a reduction of bonding strength.

In view of the above problem, laser equipment for improving an inhomogeneous energy distribution of the laser beam by using a kaleidoscope is disclosed in Japanese Patent Application Publication No. H2-266918. The kaleidoscope is made of metal, and has a cylindrical shape. The inner surface of the kaleidoscope is formed of a mirror surface. When the laser beam enters into the kaleidoscope, the laser beam is multiply reflected by the mirror surface. Because of the multiple reflections, the inhomogeneous energy distribution of the laser beam is improved. However, when the kaleidoscope is mounted on the laser equipment, cost of equipment becomes much larger. Thus, a manufacturing cost of the resin mold also becomes higher.

SUMMARY OF THE INVENTION

In view of the above problem, it is an object of the present invention to provide a method for manufacturing a resin mold, the method providing to improve inhomogeneous energy distribution of a welding spot. Further, it is another object of the present invention to provide a resin mold having strong bonding strength.

A method for manufacturing a resin mold includes the steps of: laminating a transmitting resin member capable of transmitting a laser beam as a heat source and an absorbing resin member capable of absorbing the laser beam; and irradiating the laser beam on an interface between the transmitting resin member and the absorbing resin member from a surface of the transmitting resin member so that a welding spot is formed on the interface and the transmitting resin member and the absorbing resin member are welded. The laser beam is irradiated homogeneously on the interface by a homogenizer so that a center portion of the welding spot and an outer portion of the welding spot are heated homogeneously by the laser beam.

The above method provides to improve inhomogeneous energy distribution of the welding spot so that the resin mold has high bonding strength. In the resin mold, no vaporization portion of resin and no shrinkage are formed.

Preferably, the homogenizer is a convexity disposed on the surface of the transmitting resin member. The convexity increases a reaching range of a component of the laser beam to be irradiated on the surface of the transmitting resin member, the component which reaches the center portion of the welding spot, so that the reaching range of the component becomes larger than another reaching range of another component of the laser beam, which reaches the outer portion of the welding spot. More preferably, the laser beam is irradiated on a center of the convexity in the step of irradiating so that the laser beam is irradiated on the interface through the transmitting resin member. Furthermore preferably, the method further includes the step of scanning the laser beam in a scanning direction so that the transmitting resin member and the absorbing resin member are bonded linearly. The convexity extends in parallel to the scanning direction of the laser beam, and the convexity has a width in a direction perpendicular to the scanning direction. The laser beam has a beam diameter, which is larger than the width of the convexity. Furthermore preferably, the transmitting resin member and the absorbing resin member are welded at a spot in the step of irradiating. The convexity has a circular truncated cone shape with a diameter. The laser beam has a beam diameter, which is larger than the diameter of the convexity.

Preferably, the homogenizer is a concavity disposed on the surface of the transmitting resin member. The concavity deflects the laser beam to be irradiated on the surface of the transmitting resin member so that at least a part of a component of the laser beam, which reaches the center portion of the welding spot, reaches the outer portion of the welding spot.

Preferably, the homogenizer is a laser beam adjusting means disposed in laser equipment, which radiates the laser beam. The laser beam adjusting means irradiates the laser beam on the outer portion of the welding spot preferentially. More preferably, the laser beam adjusting means is a laser beam dividing means for dividing a single laser beam into a plurality of components. Furthermore preferably, the plurality of components of the laser beam has a center, which coincides to the center portion of the welding spot. The laser beam is irradiated on the interface through the transmitting resin member. Furthermore preferably, the method further includes the step of scanning the laser beam in a scanning direction so that the transmitting resin member and the absorbing resin member are bonded linearly. The welding spot extends in parallel to the scanning direction of the laser beam, and the welding spot has a width in a direction perpendicular to the scanning direction. The laser beam has a beam distance, which is almost equal to the width of the welding spot. Furthermore preferably, the transmitting resin member and the absorbing resin member are welded at a spot in the step of irradiating. The welding spot has a diameter. The laser beam has a beam diameter, which is almost equal to the diameter of the welding spot.

Further, a resin mold includes: a transmitting resin member capable of transmitting a laser beam as a heat source; and an absorbing resin member capable of absorbing the laser beam. The transmitting resin member includes a convexity disposed on a surface of the transmitting resin member and corresponding to a bonding portion between the transmitting resin member and the absorbing resin member.

The resin mold has high bonding strength. The resin mold has no vaporization portion of resin and no shrinkage.

Preferably, the convexity is capable of homogenizing a laser beam in a case where the transmitting resin member and the absorbing resin member are bonded by the laser beam. More preferably, the convexity is capable of increasing a reaching range of a component of the laser beam to be irradiated on the surface of the transmitting resin member, the component which reaches a center portion of the bonding portion, so that the reaching range of the component becomes larger than another reaching range of another component of the laser beam, which reaches an outer portion of the bonding portion. Furthermore preferably, the bonding portion extends in a bonding direction, and has a width in a direction perpendicular to the bonding direction. The convexity extends in parallel to the bonding direction, and the convexity has a width in the direction perpendicular to the bonding direction, which is smaller than the width of the bonding portion.

Further, a resin mold includes: a transmitting resin member capable of transmitting a laser beam as a heat source; and an absorbing resin member capable of absorbing the laser beam. The transmitting resin member includes a concavity disposed on a surface of the transmitting resin member and corresponding to a bonding portion between the transmitting resin member and the absorbing resin member.

The resin mold has high bonding strength. The resin mold has no vaporization portion of resin and no shrinkage.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A method for manufacturing a resin mold according to a first embodiment of the present invention includes the steps of: attaching a transmitting resin member capable of transmitting a laser beam as a heat source and an absorbing resin member capable of absorbing the laser beam; and irradiating the laser beam on an attached surface between the transmitting resin member and the absorbing resin member from a surface of the transmitting resin member so that a welding spot is formed on the attached surface, and the transmitting resin member and the absorbing resin member are welded. In the method, the surface of the transmitting resin member includes a convexity as a homogenizer for increasing a reaching range of a component of the laser beam to be irradiated on the surface, the component which reaches a center portion of the welding spot, so that the reaching range of the component becomes larger than another reaching range of another component of the laser beam, which reaches an outer portion of the welding spot.

In the laser beam welding method, all of the laser beam to enter the transmitting resin member does not reach the welding spot. This is because a part of the laser beam is absorbed, scattered or the like. It becomes difficult for the laser beam to transmit through the transmitting resin member as the thickness of the transmitting resin member (i.e., the thickness of a part of the transmitting resin member, through which the laser beam transmits) becomes thicker.

In view of the above point, the convexity is disposed on a scanning area of the laser beam component to be irradiated on the center portion of the welding spot. The thickness of the transmitting resin member disposed on the convexity becomes larger than that of other portions. Therefore, it is difficult for the laser beam to transmit through the transmitting resin member at the center portion of the welding spot. Accordingly, the energy density at the center portion becomes smaller so that a difference of energy density between the center portion of the welding spot and the outer portion of the welding spot is reduced. This is, the inhomogeneous energy distribution at the welding spot can be improved. Thus, after the welding spot is cooled, a difference of the bonding strength between the center portion of the welding spot and the outer portion of the welding spot is reduced.

In this method, no additional device is necessitated in the laser equipment for irradiating the laser beam. Therefore, the inhomogeneous energy distribution at the welding spot can be improved at comparatively low cost. Here, "the outer portion of the welding spot" is disposed on both sides of a scanning direction axis at the center portion of the welding spot in case of a scanning welding method with scanning the laser beam. Further, "the outer portion of the welding spot" is disposed on the outside of the center portion of the welding spot in case of a spot welding method without scanning the laser beam.

The above method provides the resin mold, which includes: a transmitting resin member capable of transmitting a laser beam as a heat source; and an absorbing resin member capable of absorbing the laser beam. The transmitting resin member and the absorbing resin member are welded so that the resin mold is provided. In the resin mold, a surface of the transmitting resin member includes a convexity, which is disposed along with a welded trace. In the resin mold, there is little possibility to generate vaporization of the resin and "shrinkage" in case of laser beam welding. Therefore, the bonding strength is high. Further, the bonding strength is homogeneous over all area of the welded trace. To confirm a positioning relationship between the convexity and the welded trace, for example, the resin mold is almost vertically cut at the convexity so that the cross section is observed. Thus, the relationship between the convexity and the welded trace is observed.

The shape of the convexity is not limited particularly. The degrees of absorption and/or scattering of the laser beam are changed in accordance with a sort of the laser beam and a kind of the resin composing the transmitting resin member. Therefore, the shape of the convexity is determined appropriately in accordance with the sort of the laser beam and the kind of the resin.

The materials of the transmitting resin member and the absorbing resin member are not limited particularly. For example, they are made of thermoplastic resin such as PP (i.e., poly propylene), PC (i.e., poly carbonate), ABS (i.e., acrylonitrile-butadiene styrene polymer), PBT (i.e., poly butylenes terephthalate), and PPS (i.e., poly phenylene sulfide). Here, the resin members can include several artificial colors, reinforcing agents or the like, appropriately.

The sort of the laser beam is not limited particularly as long as the laser beam has a certain wavelength for transmitting the transmitting resin member. For example, the laser equipment is a semiconductor laser, a Nd:YAG laser, a glass-neodymium laser, a ruby laser, a hydrogen laser or the like. It is preferred that the laser equipment is the semiconductor laser, which has high energy conversion efficiency and has small equipment accommodation space. Further, a laser beam power, an irradiation density, a scanning speed in case of the scanning welding method, and an irradiation time in case of the spot welding method are not limited particularly. They can be determined appropriately in view of a cycle time of manufacturing the resin mold. The scanning welding method is, for example, a high speed welding method by using a galvanometer mirror, a batch processing method by using a lens system, a conventional sequential welding method or the like. Furthermore, a manner of the laser welding method is not limited particularly. The manner of the laser welding method can be available for every manner such as a butt welding method and an overlap welding method.

Next, the resin mold and the method for manufacturing the resin mold according to the first embodiment are described in detail as follows.

Figure 1:
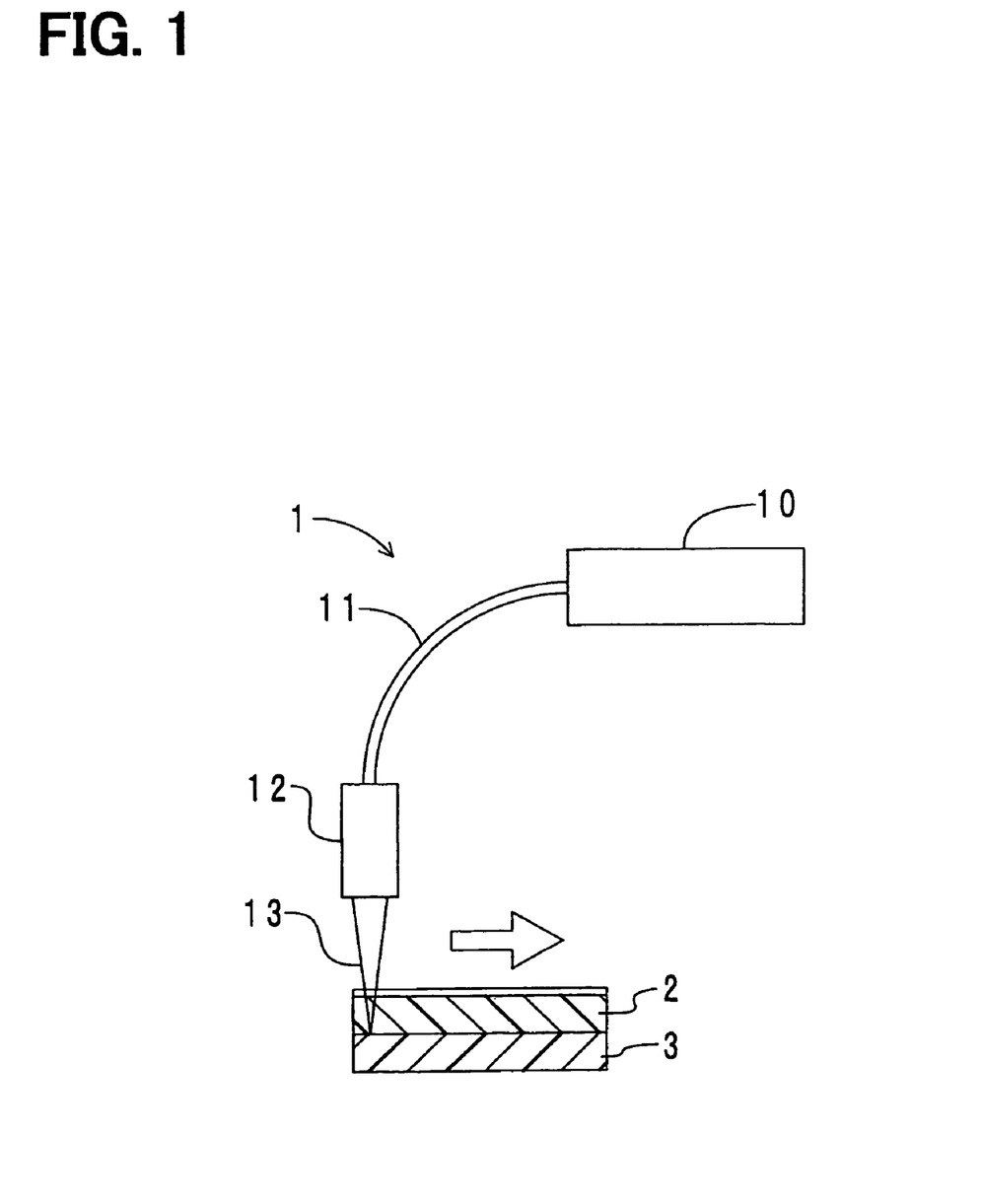
FIG. 1 is a schematic view showing laser equipment used in a method for manufacturing a resin mold according to a first embodiment of the present invention.

FIG. 1 is a schematic view showing laser equipment for using in the method for manufacturing the resin mold according to the first embodiment. The laser equipment 1 includes a laser beam generation unit 10, an optical fiber 11 and a condenser lens 12. The laser beam generation unit 10 generates the semiconductor laser beam 13. The laser beam 13 is irradiated on an attached surface between the transmitting resin member 2 and the absorbing resin member 3, which are laminated each other, from the transmitting resin member side. The laser beam 13 is scanned in a direction shown by an outline arrow in FIG. 1.

Figure 2A:
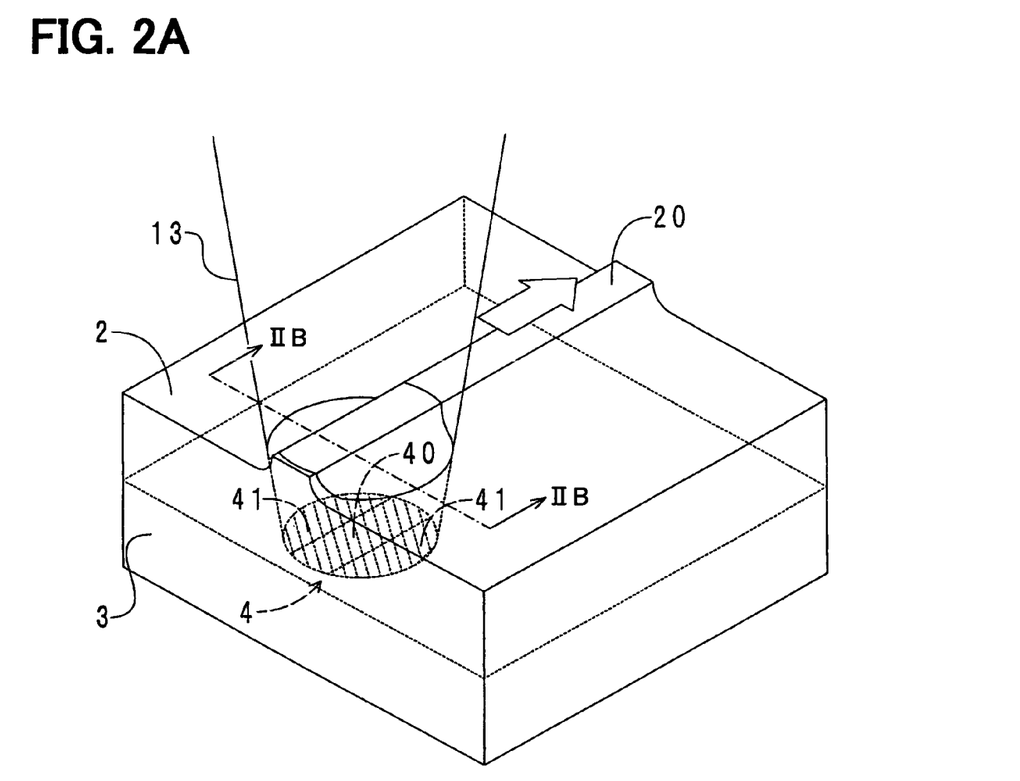
FIG. 2A is a perspective view explaining a scanning welding method.
Figure 2B:
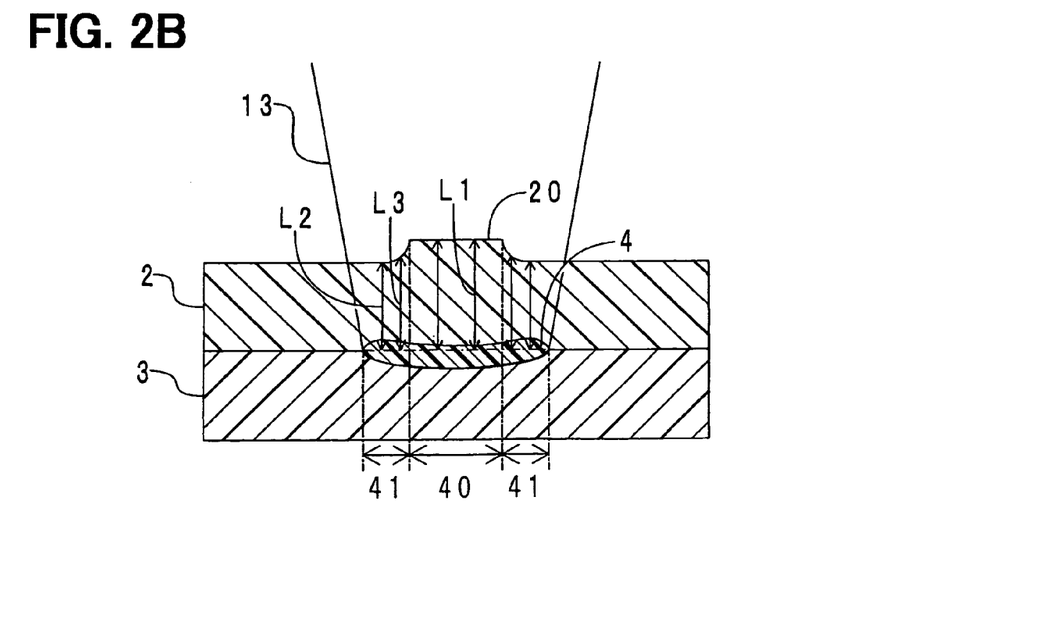
FIG. 2B is a cross sectional view showing a resin mold taken along line IIB-IIB in FIG. 2A, according to the first embodiment.

FIGS. 2A and 2B are schematic views explaining the scanning welding method according to the first embodiment. FIG. 2A is a perspective view, and FIG. 2B is a cross sectional view along with a scanning direction. The transmitting resin member 2 is a plate formed from PP by an injection molding method. A convexity 20 is formed on the surface of the transmitting resin member 2. The convexity 20 extends along with the scanning direction. The transmitting resin member 2 is capable of transmitting a laser beam 13. The absorbing resin member 3 is a plate formed from PP by an injection molding method. Therefore, the transmitting resin member 2 and the absorbing resin member 3 have compatibility each other. A carbon is added appropriately into the absorbing resin member 3 so that the absorbing resin member 3 is capable of absorbing the laser beam 13.

The laser beam 13 transmits the transmitting resin member 2, and is irradiated on the attached surface between the transmitting resin member 2 and the absorbing resin member 3. The laser beam 13 is absorbed in the absorbing resin member 3 so that a portion near the surface of the absorbing resin member 3 generates heat and the portion is melted. The heat generated in the absorbing resin member 3 conducts to the transmitting resin member 2 through the attached surface. The transmitting resin member 2 is also melted by the heat. Thus, a welding spot 4 is formed on the attached surface. By scanning the laser beam 13, above described laser beam absorption, heat generation and heat conduction are performed repeatedly.

As shown in FIG. 2B, a distance L1 is set to be longer than other distances L2, L3. The distance L1 is a length between the surface of the transmitting resin member 2 (i.e., the top of the convexity 20) and the center portion 40 of the welding spot 4. The other distances L2, L3 are lengths between the surface of the transmitting resin member 2 and the outer portion 41 of the welding spot 4. Therefore, a reaching range of a component of the laser beam 13 to be irradiated on the surface of the transmitting resin member 2, the component which reaches the center portion 40 of the welding spot 4, is longer than another reaching range of another component of the laser beam 13, which reaches the outer portion 41 of the welding spot 4. Accordingly, the difference of the energy density between the center portion 40 and the outer portion 41 can be reduced. This is, the inhomogeneous energy distribution at the welding spot 4 can be improved. Thus, after the welding spot 4 is cooled, the difference of the bonding strength between the center portion 40 and the outer portion 41 can be reduced.

In the first embodiment, no additional device such as a kaleidoscope is required in the laser equipment 1. Thus, the inhomogeneous energy distribution at the welding spot 4 can be improved at comparatively low cost.

Accordingly, the method for manufacturing the resin mold according to the first embodiment provides to improve inhomogeneous energy distribution of the welding spot 4. Further, the resin mold 4 has high bonding strength.

Second Embodiment

A method for manufacturing a resin mold according to a second embodiment of the present invention includes the steps of: attaching a transmitting resin member capable of transmitting a laser beam as a heat source and an absorbing resin member capable of absorbing the laser beam; and irradiating the laser beam on an attached surface between the transmitting resin member and the absorbing resin member from a surface of the transmitting resin member so that a welding spot is formed on the attached surface, and the transmitting resin member and the absorbing resin member are welded. In the method, the surface of the transmitting resin member includes a concavity as a homogenizer for deflecting the laser beam to be irradiated on the surface so that at least a part of a component of the laser beam, which reaches a center portion of the welding spot, reaches an outer portion of the welding spot.

The concavity is disposed on a scanning area of the laser beam component to be irradiated on the center portion of the welding spot. The laser beam component to enter the concavity reflects in accordance with a concave surface of the concavity. The concave surface is designed such that at least a part of the laser beam component reaches the outer portion of the welding spot. Therefore, the difference of the energy density between the center portion of the welding spot and the outer portion of the welding spot can be reduced. The inhomogeneous energy distribution at the welding spot is improved. Further, after the welding spot is cooled, the difference of the bonding strength between the center portion of the welding spot and the outer portion of the welding spot can be reduced.

Furthermore, in the second embodiment, no additional device is necessitated in the laser equipment for irradiating the laser beam. Therefore, the inhomogeneous energy distribution at the welding spot can be improved at comparatively low cost.

The above method provides a resin mold, which includes: a transmitting resin member capable of transmitting a laser beam as a heat source; and an absorbing resin member capable of absorbing the laser beam. The transmitting resin member and the absorbing resin member are welded so that the resin mold is provided. In the resin mold, a surface of the transmitting resin member includes a concavity, which is disposed along with a welded trace. In the resin mold, there is little possibility to generate vaporization of the resin and "shrinkage" in case of laser beam welding. Therefore, the bonding strength is high. Further, the bonding strength is homogeneous over all area of the welded trace. To confirm a positioning relationship between the concavity and the welded trace, for example, the resin mold is almost vertically cut at the concavity so that the cross section is observed. Thus, the relationship between the concavity and the welded trace is observed.

The shape of the concavity is not limited particularly. The shape of the concavity is determined appropriately in accordance with the refractive index of the transmitting resin member and the dimensions of the welding spot.

Next, the resin mold and the method for manufacturing the resin mold according to the second embodiment are described in detail as follows. A concavity 21 instead of the convexity 20 is disposed on the transmitting resin member 2.

Figure 3A:
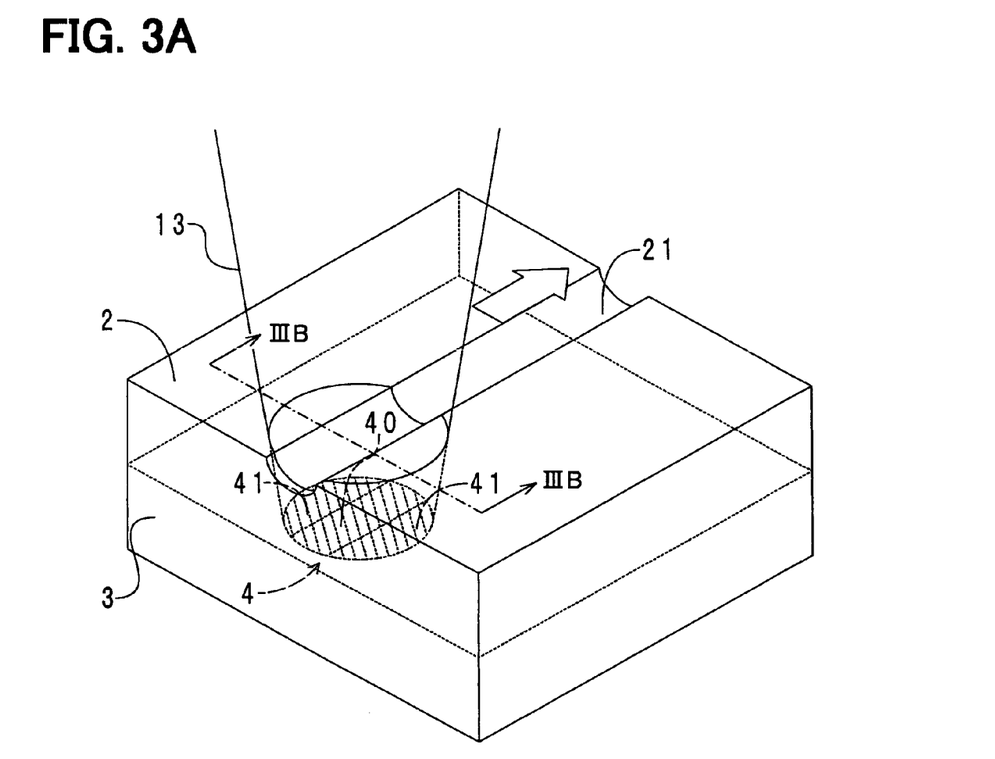
FIG. 3A is a perspective view explaining a scanning welding method.
Figure 3B:
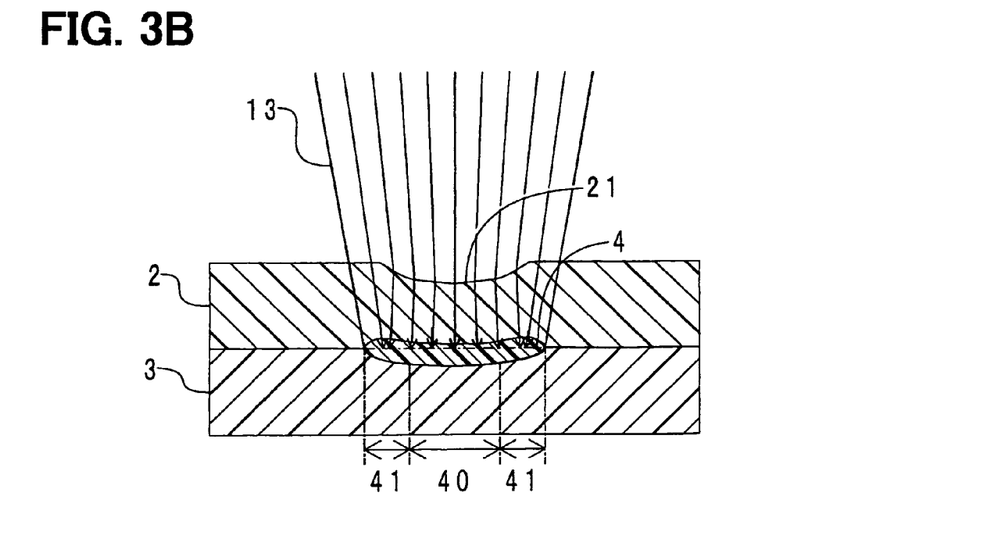
FIG. 3B is a cross sectional view showing a resin mold taken along line IIIB-IIIB in FIG. 3A, according to a second embodiment of the present invention.

FIGS. 3A and 3B are schematic views explaining the scanning welding method according to the second embodiment. FIG. 3A is a perspective view, and FIG. 3B is a cross sectional view along with a scanning direction. The concavity 21 is formed on the surface of the transmitting resin member 2. The concavity 21 extends along with the scanning direction.

As shown in FIG. 3B, a part of the component of the laser beam 13 to enter the concavity 21 is refracted toward outside in accordance with the concave surface of the concavity 21. The refracted component of the laser beam 13 reaches the outer portion 41. Thus, the difference of the energy density between the center portion 40 and the outer portion 41 can be reduced. Accordingly, the effect of the second embodiment is similar to the first embodiment.

Accordingly, the method for manufacturing the resin mold according to the second embodiment provides to improve inhomogeneous energy distribution of the welding spot 4. Further, the resin mold has high bonding strength.

Third Embodiment

A method for manufacturing a resin mold according to a third embodiment of the present invention includes the steps of: attaching a transmitting resin member capable of transmitting a laser beam as a heat source and an absorbing resin member capable of absorbing the laser beam; and irradiating the laser beam on an attached surface between the transmitting resin member and the absorbing resin member from a surface of the transmitting resin member so that a welding spot is formed on the attached surface, and the transmitting resin member and the absorbing resin member are welded. In the method, the laser beam is irradiated by laser equipment having a laser beam adjusting means for irradiating the laser beam on the outer portion of the welding spot preferentially.

In the laser equipment, the laser beam by itself can be preferentially irradiated on the outer portion of the welding spot. Therefore, the transmitting resin member may not have the convexity or the concavity. Accordingly, degree of freedom of designing a shape of the transmitting resin member becomes higher. Further, the difference of the energy density between the center portion of the welding spot and the outer portion of the welding spot can be reduced. Thus, the inhomogeneous energy distribution at the welding spot is improved. Further, after the welding spot is cooled, the difference of the bonding strength between the center portion of the welding spot and the outer portion of the welding spot can be reduced. Here, "the preferential irradiation" includes cases where the laser beam is irradiated on both of the center portion and the outer portion of the welding spot and where the laser beam is irradiated only on the outer portion of the welding spot.

The laser beam adjusting means is, for example, the laser equipment having multiple laser beam generation units for irradiating independent multiple laser beams.

Preferably, the laser beam adjusting means is a laser beam dividing means for dividing a single laser beam into a plurality of components. In this case, it is required to equip only one laser beam generation unit. The laser beam dividing means is a prism, a diffraction device or the like.

Next, the resin mold and the method for manufacturing the resin mold according to the third embodiment are described in detail as follows. The resin mold has no convexity 20 disposed on the transmitting resin member 2. Further, the laser beam 13 is divided by the laser beam dividing means, and then, the laser beam 13 is irradiated.

Figure 4A:
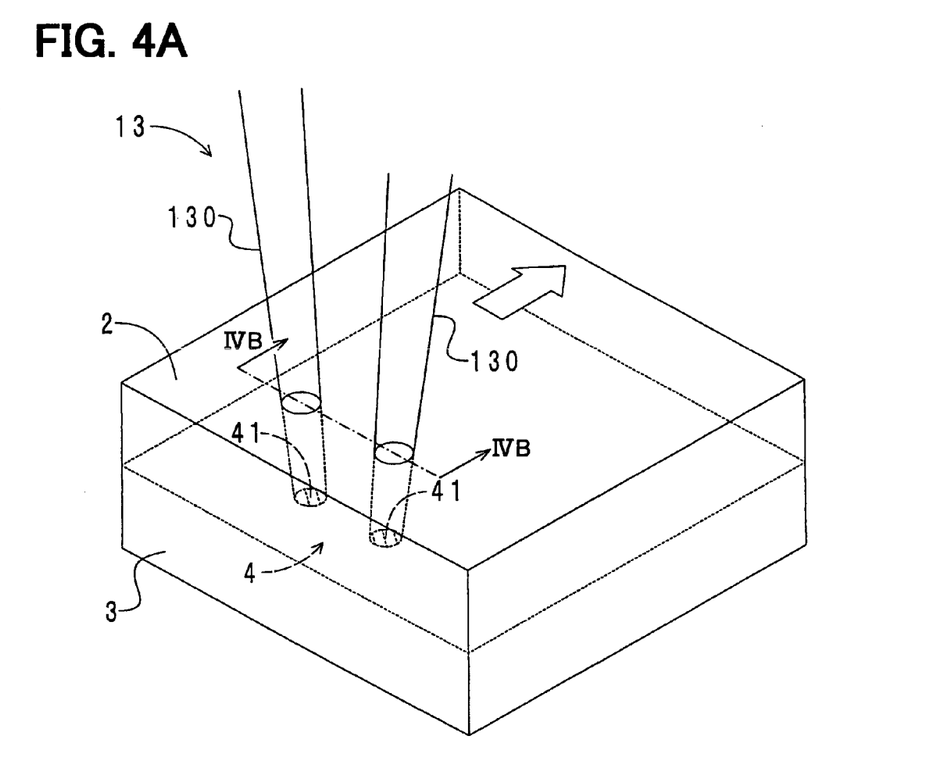
FIG. 4A is a perspective view explaining a scanning welding method.
Figure 4B:
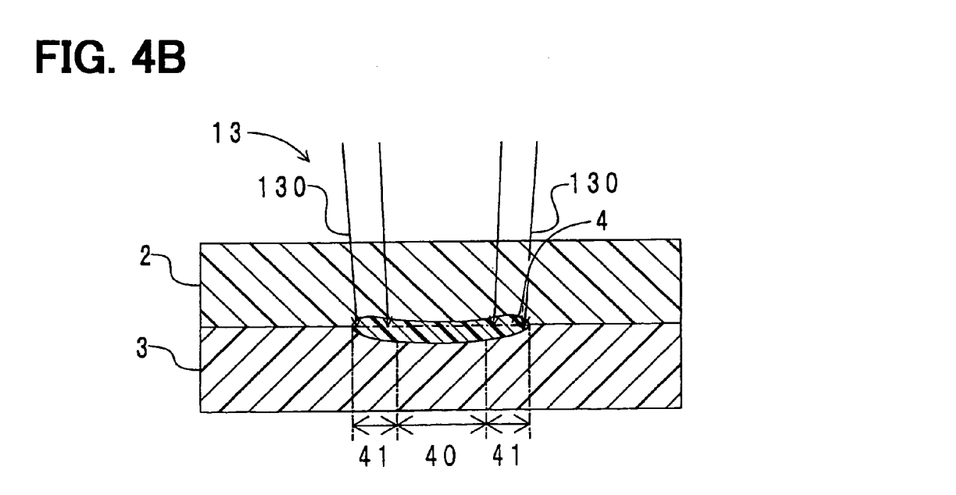
FIG. 4B is a cross sectional view showing a resin mold taken along line IVB-IVB in FIG. 4A, according to a third embodiment of the present invention.

FIGS. 4A and 4B are schematic views explaining the scanning welding method according to the third embodiment. FIG. 4A is a perspective view, and FIG. 4B is a cross sectional view along with a scanning direction. The laser beam 13 is divided into two components 130 by the laser beam dividing means (i.e., a prism), which is accommodated in the laser equipment (not shown). Two components 130 are irradiated on the outer portion 41 of the welding spot 4. The heat generated in the outer portion 41 by the two components 130 conducts to the center portion 40 and the transmitting resin member 2.

The effect of the third embodiment is similar to the first embodiment. Further, in the laser equipment used in the third embodiment, the laser beam 13 can be irradiated only on the outer portion 41 of the welding spot 4. Therefore, the convexity 20 and the concavity 21 may not be required to be disposed on the transmitting resin member 2. Accordingly, the degree of freedom of designing the shape of the transmitting resin member 2 becomes higher.

Accordingly, the method for manufacturing the resin mold according to the third embodiment provides to improve inhomogeneous energy distribution of the welding spot 4. Further, the resin mold has high bonding strength.

Fourth Embodiment

A resin mold and a method for manufacturing the resin mold according to a fourth embodiment of the present invention are described in detail as follows. In the method, a spot welding method instead of the scanning welding method is performed.

Figure 5:
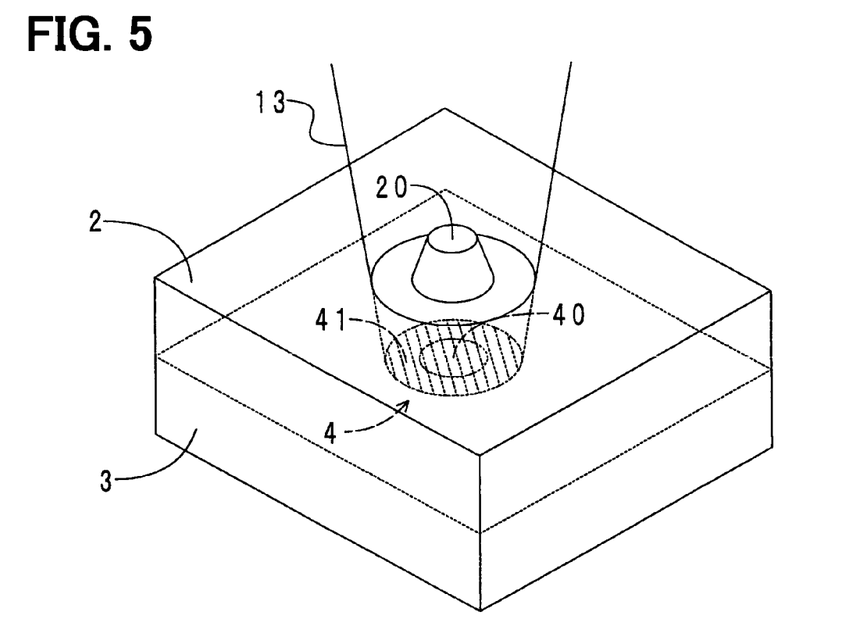
FIG. 5 is a perspective view explaining a spot welding method, according to a fourth embodiment of the present invention.

FIG. 5 is a schematic perspective view explaining a spot welding method according to the fourth embodiment. The convexity 20 has a circular truncated cone shape, the top of which is cut. In the welding spot 4 according to the fourth embodiment, the outer portion 41 is ringed and disposed around the center portion 40. The effect of the fourth embodiment is similar to the first embodiment.

Accordingly, the method for manufacturing the resin mold accordingly to the fourth embodiment provides to improve inhomogeneous energy distribution of the welding spot 4. Further, the resin mold has high bonding strength.

Fifth Embodiment

A resin mold and a method for manufacturing the resin mold according to a fifth embodiment of the present invention are described in detail as follows. In the method, a spot welding method instead of the scanning welding method is performed.

Figure 6:
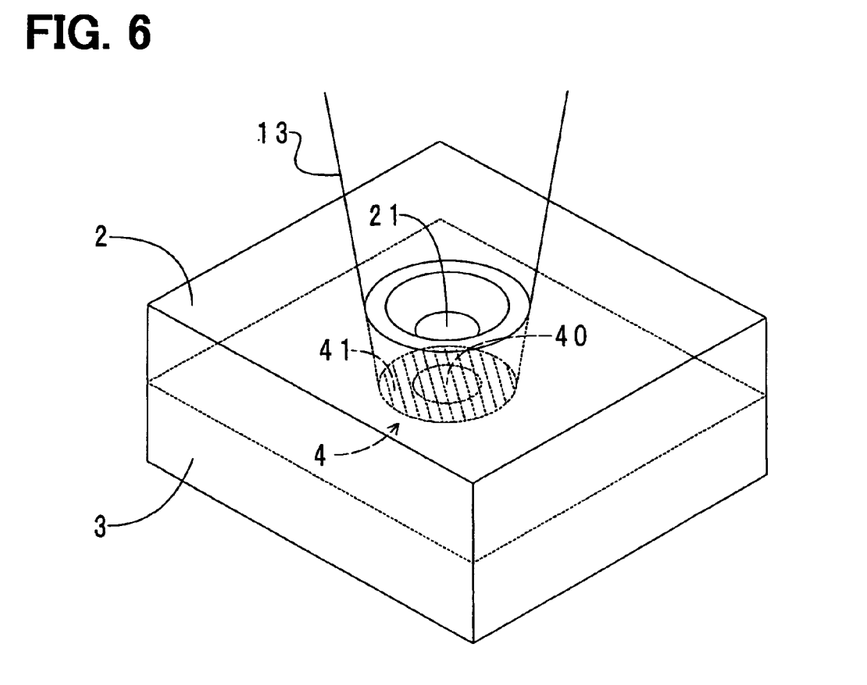
FIG. 6 is a perspective view explaining a spot welding method, according to a fifth embodiment of the present invention.

FIG. 6 is a schematic perspective view explaining a spot welding method according to the fifth embodiment. The concavity 21 has a concave shape. In the welding spot 4 according to the fifth embodiment, the outer portion 41 is ringed and disposed around the center portion 40. The effect of the fourth embodiment is similar to the second embodiment.

Accordingly, the method for manufacturing the resin mold according to the fourth embodiment provides to improve inhomogeneous energy distribution of the welding spot 4. Further, the resin mold has high bonding strength.

Sixth Embodiment

A resin mold and a method for manufacturing the resin mold according to a sixth embodiment of the present invention are described in detail as follows. In the method, a spot welding method instead of the scanning welding method is performed. Further, the laser beam having a ring shape is irradiated.

Figure 7:
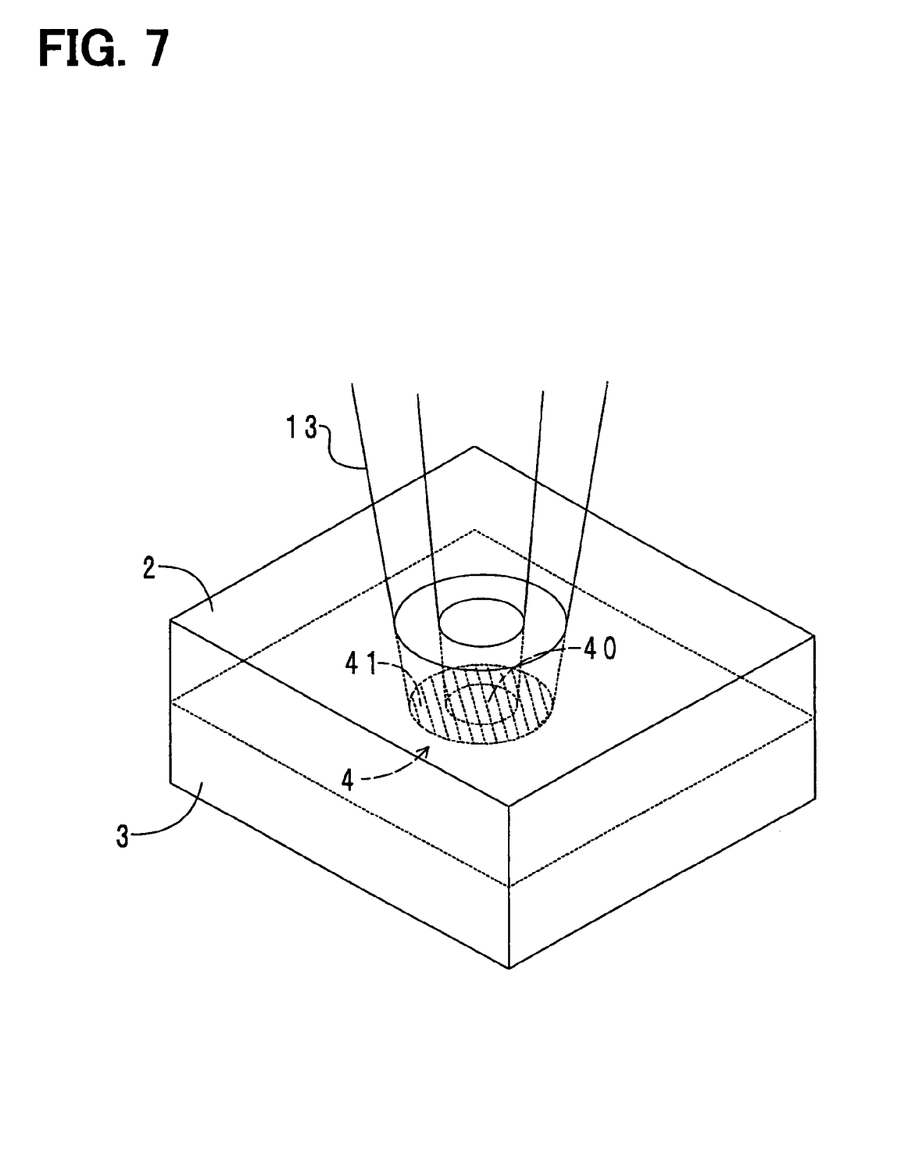
FIG. 7 is a perspective view explaining a spot welding method, according to a sixth embodiment of the present invention.

FIG. 7 is a schematic perspective view explaining a spot welding method according to the sixth embodiment. The laser beam 13 having the ring shape is irradiated only on the outer portion 41 of the welding spot 4. The heat generated in the outer portion 41 by the laser beam 13 conducts to the center portion 40 and the transmitting resin member 2. The effect of the sixth embodiment is similar to the third embodiment.

Accordingly, the method for manufacturing the resin mold according to the sixth embodiment provides to improve inhomogeneous energy distribution of the welding spot 4. Further, the resin mold has high bonding strength.

Such changes and modifications are to be understood as being within the scope of the present invention as defined by the appended claims.

What is claimed is:

1. A method for manufacturing a resin mold, the method comprising the steps of:

laminating a transmitting resin member capable of transmitting a laser beam as a heat source and an absorbing resin member capable of absorbing the laser beam;

irradiating the laser beam on an interface between the transmitting resin member and the absorbing resin member from surface of the transmitting resin member so that a welding spot is formed on the interface and the transmitting resin member and the absorbing resin member are welded, wherein the laser beam is irradiated homogeneously on the interface by a homogenizer so that a center portion of the welding spot and an outer portion of the welding spot are heated homogeneously by the laser beam, the homogenizer is a convexity disposed on the surface of the transmitting resin member, the convexity increases a reaching range of a component of the laser beam to be irradiated on the surface of the transmitting resin member, the component which reaches the center portion of the welding spot, so that the reaching range of the component becomes larger than another reaching range of another component of the laser beam, which reaches the outer portion of the welding spot, and the laser beam is irradiated on a center of the convexity in the step of irradiating so that the laser beam is irradiated on the interface through the transmitting resin member; and scanning the laser beam in a scanning direction so that the transmitting resin member and the absorbing resin member are bonded linearly, wherein the convexity extends in parallel to the scanning direction of the laser beam, and the convexity has a width in a direction perpendicular to the scanning direction, and the laser beam has a beam diameter, which is larger than the width of the convexity.

2. A method for manufacturing a resin mold, the method comprising the steps of:

laminating a transmitting resin member capable of transmitting a laser beam as a heat source and an absorbing resin member capable of absorbing the laser beam; and irradiating the laser beam on an interface between the transmitting resin member and the absorbing resin member from a surface of the transmitting resin member so that a welding spot is formed on the interface and the transmitting resin member and the absorbing resin member are welded, wherein the laser beam is irradiated homogeneously on the interface by a homogenizer so that a center portion of the welding spot and an outer portion of the welding spot are heated homogeneously by the laser beam, the homogenizer is a convexity disposed on the surface of the transmitting resin member, the convexity increases reaching range of a component of the laser beam to be irradiated on the surface of the transmitting resin member, the component which reaches the center portion of the welding spot, so that the reaching range of the component becomes larger than another reaching range of another component of the laser beam, which reaches the outer portion of the welding spot, the laser beam is irradiated on a center of the convexity in the step of irradiating so that the laser beam is irradiated on the interface through the transmitting resin member, the transmitting resin member and the absorbing resin member are welded at a spot in the step of irradiating, the convexity has a circular truncated cone shape with a diameter, end the laser beam has a beam diameter, which is larger than the diameter of the convexity.

3. A method for manufacturing a resin, the method comprising the steps of:

laminating a transmitting resin member capable of transmitting a laser beam as a heat source and an absorbing resin member capable of absorbing the laser beam;

irradiating the laser beam on an interface between the transmitting resin member and the absorbing resin member from a surface of the transmitting resin member so that a welding snot is formed an the interface and the transmitting resin member and the absorbing resin member are welded, wherein the laser beam is irradiated homogeneously on the interface by a homogenizer so that a center portion of the welding spot and an outer portion of the welding spot are heated homogeneously by the laser beam, the homogenizer is a concavity disposed on the surface of the transmitting resin member, the concavity deflects the laser beam to be irradiated on the surface of the transmitting resin member so that at least a part of a component of the laser beam, which reaches the center portion of the welding spot, reaches the outer portion of the welding spot, and the laser beam is irradiated on a center of the concavity in the step of irradiating so that the laser beam is irradiated an the interface through the transmitting resin member; and scanning the laser beam in a scanning direction so that the transmitting resin member and the absorbing resin member are bonded linearly, wherein the concavity extends in parallel to the scanning direction of the laser beam, and the concavity has a width in a direction perpendicular to the scanning direction, and the laser beam has a beam diameter, which is larger than the width of the concavity.

4. A method for manufacturing a resin, the method comprising the step of:

laminating a transmitting resin member capable of transmitting a laser beam as a heat source and an absorbing resin member capable of absorbing the laser beam; and irradiating the laser beam on an interface between the transmitting resin member and the absorbing resin member from a surface of the transmitting resin member so that a welding spot is formed on the interface and the transmitting resin member and the absorbing resin member are welded, wherein the laser beam is irradiated homogeneously on the interface by a homogenizer so that a center portion of the welding spot and an outer portion of the welding spot are heated homogeneously by the laser beam, the homogenizer is a concavity disposed on the surface of the transmitting resin member, the concavity deflects the laser beam to be irradiated on the surface of the transmitting resin member so that at least a part of a component of the laser beam, which reaches the center portion of the welding spot, reaches the outer portion of the welding spot, the laser beam is irradiated on a center of the concavity in the step of irradiating so that the laser beam is irradiated on the interface through the transmitting resin member, the transmitting resin member and the absorbing resin member are welded at a spot in the step of irradiating, the concavity has a circular truncated cone shape with a diameter, and the laser beam has a beam diameter, which is larger than the diameter of the concavity.

* * * * *